(12) United States Patent
Smailus et al.

(10) Patent No.: US 9,612,131 B2
(45) Date of Patent: Apr. 4, 2017

(54) IDENTIFYING AND CONFIGURING CONTROLS ON A CONTROL PANEL

(75) Inventors: Thomas O. Smailus, Sammamish, WA (US); Monica C. Rosman Lafever, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 458 days.

(21) Appl. No.: 13/442,564

(22) Filed: Apr. 9, 2012

(65) Prior Publication Data

US 2013/0265425 A1    Oct. 10, 2013

(51) Int. Cl.
| | | |
|---|---|---|
| *G01C 23/00* | (2006.01) | |
| *B64D 43/00* | (2006.01) | |
| *B64D 31/04* | (2006.01) | |

(52) U.S. Cl.
CPC ............ *G01C 23/00* (2013.01); *B64D 43/00* (2013.01); *B64D 31/04* (2013.01)

(58) Field of Classification Search
CPC .......... G05D 1/00; G08B 21/00; G01C 21/00; G06F 17/00; G06F 3/044; G06F 3/0416; G06F 3/0484; G06F 9/4446; G01S 19/13; G01S 19/49; G06K 2209/03; G06K 9/00; G06T 5/006; G07F 19/206
USPC ...... 701/3; 340/945; 382/100, 190; 348/135, 348/E07.085
See application file for complete search history.

(56) References Cited

U.S. PATENT DOCUMENTS

| | | | | |
|---|---|---|---|---|
| 3,748,644 A | * | 7/1973 | Tisdale .......................... | 382/201 |
| 3,876,864 A | * | 4/1975 | Clark et al. .................... | 235/379 |
| 4,564,277 A | * | 1/1986 | Koch ........................ | G03B 3/12 |
| | | | | 396/342 |
| 4,604,064 A | * | 8/1986 | Boehm et al. ................ | 434/224 |
| 5,888,074 A | * | 3/1999 | Staplin et al. ................ | 434/258 |
| 6,033,226 A | * | 3/2000 | Bullen .......................... | 434/219 |
| 6,919,917 B1 | * | 7/2005 | Janssen .................. | B60Q 9/005 |
| | | | | 348/143 |
| 8,188,880 B1 | * | 5/2012 | Chi ...................... | G02B 27/017 |
| | | | | 340/815.45 |
| 2002/0154153 A1 | * | 10/2002 | Messinger et al. .......... | 345/705 |

(Continued)

FOREIGN PATENT DOCUMENTS

| | | | | |
|---|---|---|---|---|
| CN | 101897599 A | 12/2010 | | |
| CN | 102163083 A | 8/2011 | | |
| EP | 2196775 A2 | 6/2010 | | |
| GB | 2420646 A | * 11/2005 | ............. | G06Q 50/00 |
| GB | 2420646 A | 5/2006 | | |
| JP | 2000259236 A | 9/2000 | | |

OTHER PUBLICATIONS

International Search Report and Written Opinion for Application No. PCT/US2013/026733, mailed Jul. 11, 2013, 9 pages.

(Continued)

*Primary Examiner* — Jay Patel
*Assistant Examiner* — Shadan E Haghani
(74) *Attorney, Agent, or Firm* — Toler Law Group, PC

(57) ABSTRACT

A method includes receiving, at a processor from a camera, image data associated with a control panel. The method also includes presenting one or more images at a display. The one or more images are generated based on the image data. The method includes determining a location of a first control of the control panel based on the image data and based on control settings data. The method includes providing an indication of the location of the first control at the display, and providing an indication of a desired configuration of the first control at the display.

17 Claims, 10 Drawing Sheets

(56) References Cited

U.S. PATENT DOCUMENTS

| | | | |
|---|---|---|---|
| 2006/0028012 A1* | 2/2006 | Holder | B42D 1/009 283/66.1 |
| 2006/0180648 A1 | 8/2006 | Miller et al. | |
| 2007/0115358 A1* | 5/2007 | McCormack | G06T 7/0018 348/159 |
| 2007/0150119 A1 | 6/2007 | Mitchell et al. | |
| 2007/0236366 A1* | 10/2007 | Gur | G06K 9/00 340/945 |
| 2009/0112349 A1 | 4/2009 | Cobb et al. | |
| 2010/0152924 A1* | 6/2010 | Pandit et al. | 701/3 |
| 2010/0214130 A1* | 8/2010 | Weinmann | G06K 9/00 382/104 |
| 2011/0149266 A1 | 6/2011 | Motzer et al. | |
| 2011/0313597 A1* | 12/2011 | Wilson et al. | 701/3 |

OTHER PUBLICATIONS

International Preliminary Report on Patentability for International Application No. PCT/US2013/026733, Date of Mailing Oct. 23, 2014, ISA/EPO, 7 pages.

Notice of Reasons for Rejection for Japanese Patent Application No. 2015-504533, Dated Nov. 1, 2016, 5 pages.

Canadian Office Action, Application No. 2,860,805; Canadian Intellectual Property Office; Dec. 2, 2015 (4 pages).

Chinese Office Action, Application No. 201380018811.8, State Intellectual Property Office of PRC; May 4, 2016 (14 pages).

Second Chinese Office Action, Application No. 201380018811.8, State Intellectual Property Office of PRC, dated Dec. 13, 2016, 18 pgs.

* cited by examiner

IDENTIFYING AND CONFIGURING CONTROLS ON A CONTROL PANEL

FIELD OF THE DISCLOSURE

The present disclosure is generally related to identifying and configuring controls on a control panel.

BACKGROUND

Many systems include controls that are configured for operation of the system. For example, aircraft cockpits may include numerous controls that are configured according to a particular operation of the aircraft (e.g., to perform takeoff, to land, etc.). Aircraft personnel may configure the control panel(s) in the cockpit based on one or more checklists. These checklists may be in paper or electronic form and may direct the aircraft personnel to manually locate and configure each of the controls identified in the checklist. Locating a particular control identified by the checklist may be time consuming. Additionally, some situations may require that the checklist tasks be completed within a relatively short period of time, or require numerous aircraft personnel to communicate with each other during the configuration process.

SUMMARY

A device may be configured to receive image data (e.g., video data) from a camera and to present the image data at a display. The image data may be associated with a control panel (e.g., an aircraft control panel, a submarine control panel, a manufacturing control panel, a ship control panel, a helicopter control panel, a train control panel, an oil platform control panel, etc.). The device may process the image data to guide a user of the device through a configuration process to configure the controls of the control panel.

For example, the device may present one or more symbols or indicators as graphical overlays at the display. The graphical overlays may provide instructions to the user indicating that a particular control of the control panel is to be configured. Additionally, the graphical overlays may indicate a particular configuration of the control, a direction to move the control (e.g., turn the control to the right), or another configuration command. The user of the device may review the image data and the one or more graphical overlays presented at the display prior to configuring the particular control. The device may detect that the configuration of the particular control has been modified and verify that the control is properly configured. If the control is properly configured, the device may update the display to present additional graphical overlays, instructions, and symbols associated with configuring additional controls of the control panel. Thus, the device may use augmented reality to assist and guide a user (or multiple users) through the process of configuring a control panel.

In a particular embodiment, a method of identifying and configuring a control panel is disclosed. The method includes receiving, at a processor from a camera, image data associated with a control panel. The method also includes presenting one or more images at a display. The one or more images are generated based on the image data. The method includes determining a location of a first control of the control panel based on the image data and based on control settings data. The method includes providing an indication of the location of the first control at the display, and providing an indication of a desired configuration of the first control at the display.

In another embodiment, an apparatus includes a camera, a display, a processor, and a memory. The memory includes instructions that, when executed by the processor cause the processor to receive or process image data associated with a control panel from the camera. The memory includes instructions that, when executed by the processor cause the processor to present one or more images at the display. The one or more images are generated based on the image data. The memory includes instructions that, when executed by the processor cause the processor to determine a location of a first control of the control panel based on the image data and based on control settings data. The memory includes instructions that, when executed by the processor cause the processor to provide an indication of the location of the first control at the display. The memory includes instructions that, when executed by the processor cause the processor to provide an indication of a desired configuration of the first control at the display.

In yet another embodiment, a non-transitory computer-readable storage medium includes instructions that, when executed by a processor, cause the processor to receive or process image data from a camera associated with a control panel. The non-transitory computer-readable storage medium further includes instructions that, when executed by the processor, cause the processor to present one or more images at a display. The one or more images are generated based on the image data. The non-transitory computer-readable storage medium further includes instructions that, when executed by the processor, cause the processor to determine a location of a first control of the control panel based on the image data and based on control settings data. The non-transitory computer-readable storage medium further includes instructions that, when executed by the processor, cause the processor to provide an indication of the location of the first control at the display and an indication of a desired configuration of the first control at the display.

DETAILED DESCRIPTION

Figure 1:
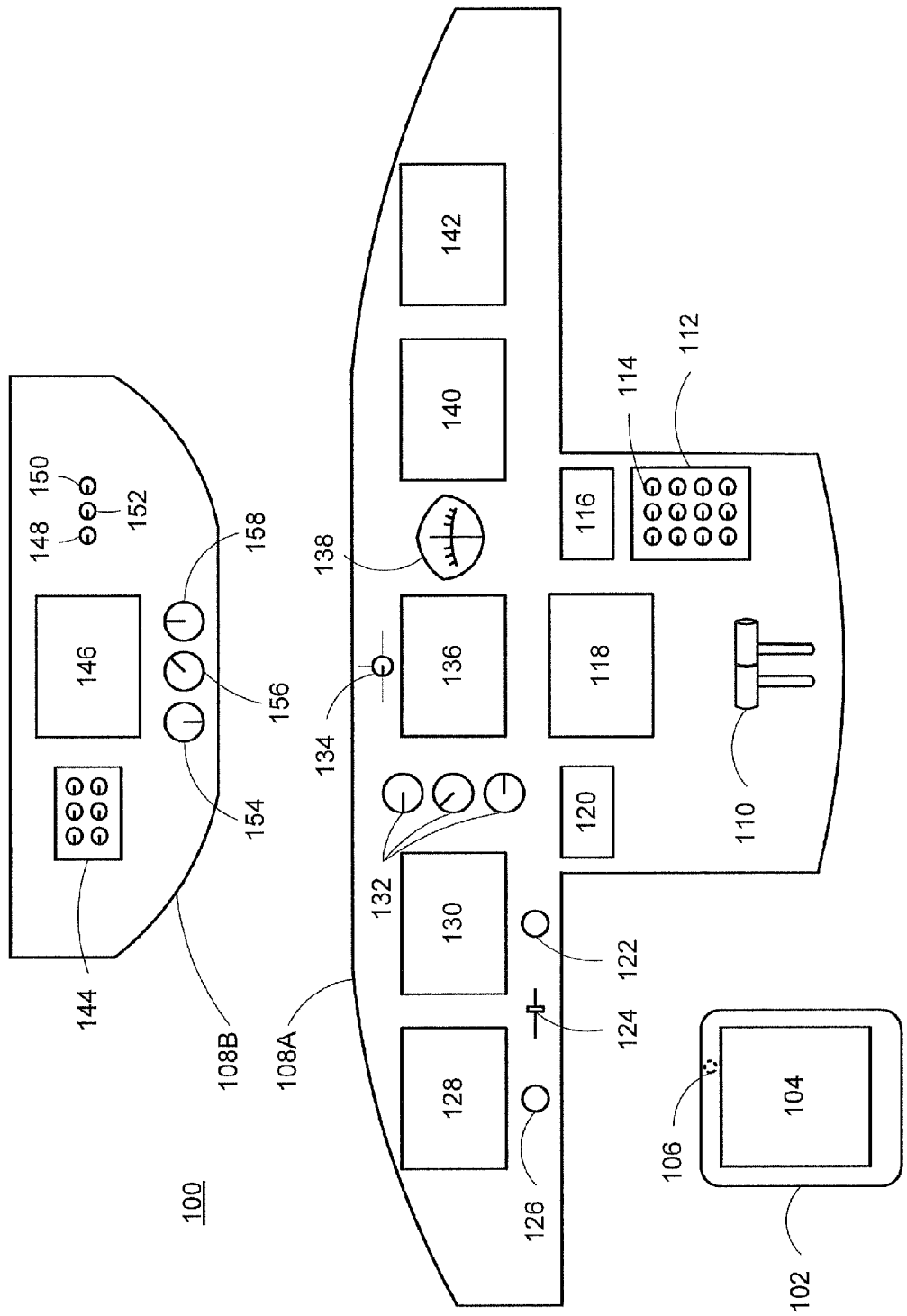
FIG. 1 is a block diagram of an illustrative embodiment of a system to identify and configure a control panel.

Referring to FIG. 1, a particular embodiment of a system 100 for identifying and configuring a control panel is disclosed. The system 100 includes a device 102 and a control panel (e.g., control panels 108A, 108B). The device 102 may include a display 104 and a camera 106. In a particular embodiment, the display 104 may be a touch screen display. The display 104 is configured to display one or more images generated based on image data received from the camera 106. The device 102 may also include input/output devices (not shown) including a stylus pen, a mouse, a keyboard, etc. The device 102 may include a wireless communication capability that enables the device 102 to communicate with another device (not shown) via a wireless communication link using one or more wireless communication protocols (e.g., an IEEE 802.11X protocol, a Bluetooth protocol, etc.). The device 102 may be a portable computing device (e.g., a laptop computer), a tablet, a smart phone, an electronic flight bag, or another computing device. In a particular embodiment, the camera 106 is located on, or otherwise integrated into, the device 102. In another particular embodiment, one or more cameras (not shown) are located external to the device 102 (e.g., within a cockpit of an aircraft). In another particular embodiment, the camera 106 may be located on a headset, a visor of a hat, a pair of glasses, etc. The device 102 may receive the image data from the camera 106 and present the one or more images at the display 104.

The control panel may include a plurality of controls 110-158. The plurality of controls may include switches, circuit breakers, knobs, slide controls, gauges, displays, levers, indicators, and other controls. As shown in FIG. 1, the control panel may include a first portion (e.g., the control panel 108A) and a second portion (e.g., the control panel 108B). A first set of controls (e.g., the controls 110-142) of the plurality of controls 110-158 may be located on the first portion of the control panel (e.g., the control panel 108A) and a second set of controls (e.g., the controls 144-158) of the plurality of controls 110-158 may be located on a second portion of the control panel (e.g., the control panel 108B). In an alternative embodiment, the control panel may include a single portion (e.g., only the control panel 108A) and the plurality of controls 110-158 may be located on the single portion of the control panel.

As shown in FIG. 1, the plurality of control may include thrust levers 110, displays 116-120, 128, 130, 136, 140, 142, 146, gauges 132 and 154-158, a knob control 134, switches 148-152, switch boxes 112, 144, a slide control 124, and/or indicators 122, 126, and 138. The switch box 112 may include a plurality of switches (e.g., switch 114). The switch box 144 may include a plurality of switches.

The device 102 may store control settings data associated with one or more control panels (e.g., the control panels 108A, 108B). The device 102 may receive the control settings data from a network, from data storage at the control panel, from an external device (e.g., a universal serial bus (USB) drive), or from another computing device. The control settings data may be associated with an electronic checklist. The electronic checklist may include one or more tasks to configure the control panel for a particular operation (e.g., a pre-flight checklist, an aircraft landing procedure checklist, a checklist associated with tasks to be completed in response to detection of another condition, etc.). In a particular embodiment, the control settings data may include control data that identifies a layout of the one or more controls of the control panel. The control settings data may include directional data associated with each of the one or more controls of the control panel, and the directional data indicates a direction to a second control from a first control.

For example, the control settings data may include directional data associated with a first control (e.g., the gauges 132). The directional data associated with the first control may indicate that the first control is located to the left of a second control (e.g., the display 136) and to the right of a third control (e.g., the display 130). The directional data associated with the first control may further indicate that the first control is located above a fourth control (e.g., the display 120). A particular electronic checklist may include a step associated with configuring, or otherwise verifying a reading of the first control. The device 102 may determine a location of the first control based at least in part on the directional data associated with the first control. For example, the device 102 may receive the image data from the camera 106. The device 102 may identify the first control (e.g., the gauges 132) based on the control data that identifies the layout of the one or more controls of the control panel, electronic checklist data, or any combination thereof. The device 102 may identify one or more reference controls based on the control data and the image data. The one or more reference controls may correspond to one or more controls within a field of view of the camera 106. The device 102 may determine a location of the first control relative to the one or more reference controls based on the directional data associated with the first control, based on directional data associated with the one or more reference controls, or any combination thereof.

For example, the device 102 may determine that a first reference control (e.g., the display 120) is within the field of view of the camera 106. The device 102 may determine that the first control (e.g., the gauges 132) is located above the first reference control based on the directional data associated with the first control. In response to determining that the first control is located above the reference control, the device 102 may present one or more graphical overlays at the display 104. The one or more graphical overlays may indicate a direction to pan the camera 106 such that the first control is within the field of view of the camera 106. Thus, for any particular control, the device 102 may determine a location of another particular control based on the directional data. The device 102 may be configured to present one or more tasks included in the electronic checklist at the display 104. The device 102 may use image data received from the camera 106 to guide a user of the device 102 through one or more of the configuration tasks associated with the electronic checklist.

For example, the device 102 may receive image data from the camera 106. The image data may be associated with at least a portion of a control panel (e.g., the control panels 108A, 108B) that is within a field of view of the camera 106. The device 102 may present the image data, or one or more pictures representing the image data, at the display 104 as described with reference to FIGS. 2-7. The device 102 may identify a first control of the control panel based on the control settings data and determine the location of the first control based on the image data received from the camera 106. The device 102 may present an indication of the location of the first control on the display 104. If the location of the first control is in a current field of view of the camera 106, the device 102 may indicate the location of the first control by overlaying one or more symbols (e.g., a box) over the image data, or a portion of the image data presented at the display 104.

If the location of the first control is not in the current field of view of the camera 106, the device 102 may determine the direction from the current field of view to the location of the first control based on the control settings data. In a particular embodiment, the device 102 may determine the direction from the current field of view to the location of the first control based on the control settings data and data provided via one or more sensors of the device 102 (e.g., one or more inertial sensors, one or more orientation sensors, etc.). The device 102 may indicate the direction from the current field of view to the location of the first control by overlaying one or more symbols (e.g., an arrow) over the image data presented at the display 104. A user may move the device 102 such that the field of view of the camera 106 travels in the indicated direction. As the device 102 is moved, the camera 106 receives additional image data, which is presented at the display 104.

In a particular embodiment, the device 102 may determine a current orientation of the device 102 and/or the camera 106 relative to the control panel based on the additional image data, based on the control settings data, based on the one or more sensors (e.g., the one or more inertial sensors, the one or more orientation sensors, etc.), or a combination thereof, as the device 102 is moved. In a particular embodiment, determining the orientation of the device 102 and/or the camera 106 relative to the control panel may include comparing the image data to the additional image data. For example, the device 102 may identify a first location of a particular control based on at least a portion of the image data and identify a second location of the particular control in at least a portion of the additional image data. The device 102 may use the control settings data to determine the current orientation of the device 102 and/or the camera 106 based on a comparison of the first location and the second location. The device 102 may update the direction from the current field of view to the location of the first control based on the current orientation of the device 102 and/or the camera 106.

In a particular embodiment, the orientation of the camera 106 (e.g., an orientation of the field of view of the camera 106) may be related to an orientation of the device 102. For example, when the device 102 is moved from a first position to a second position that is to the left of the first position, the field of view of the camera 106 may move to the left. Thus, an object (e.g., a control of a control panel) that is within the field of view of the camera 106 when the device 102 is in the first position may be to the right of, and outside of the field of view of the camera 106 when the device 102 is in the second position. Alternatively, the object that is within the field of view of the camera 106 when the device 102 is in the first position may be within the field of the camera 106, but positioned further to the right of the field of view as the device 102 is moved to the second position.

In another particular embodiment, the orientation of the camera 106 (e.g., an orientation of the field of view of the camera 106) may not directly correspond to the orientation of the device 102. For example, when the device 102 is rotated to the right as the device 102 is moved from the first position to the second position, the field of view of the camera 106 may correspond to the field of view of the camera 106 when the device 102 was in the first position. Thus, the field of view of the camera 106 may not substantially change when the device 102 is moved. In a particular embodiment, the field of view of the camera 106 may be enlarged in the direction of the rotation of the device 102 due to a change in the perspective of the camera 106 relative to the object (e.g., the control of the control panel). For example, when the device 102 is in the first position, an object (e.g., a control of a control panel) may be located along a leftmost edge of the field of view of the camera 106. When the device 102 is rotated to the right as the device 102 is moved from the first position to the second position, the object may remain located along the leftmost edge of the field of view of the camera 106, but one or more other objects (e.g., one or more other controls or portions of the control panel) that were located to the right of a rightmost edge of the field of view when the device 102 was in the first position may be included within the field of view of the camera 106 when the device 102 is in the second position.

In another particular embodiment, determining the orientation of the device 102 and/or the camera 106 relative to the control panel may include monitoring changes in sensor data received from the one or more sensors as the device 102 is moved and calculating a position of the camera 106 based on the sensor data. The sensor data may indicate that the device 102 has been moved horizontally (e.g., moved to the left or to the right), moved vertically (e.g., moved up or down), rotated horizontally (e.g., rotated or tilted to the left or to the right), rotated vertically (e.g., rotated or tilted up or down), or a combination thereof. For example, the device 102 may receive first sensor data indicating that the device 102 and/or the camera 106 is oriented in a first position (i.e., the orientation of the device 102 when the image data was received). As the device 102 is moved (e.g., in the direction of the first control as indicated at the display 104), the device 102 may receive additional sensor data. The additional sensor data may indicate that the device 102 and/or the camera 106 is oriented in a second position (e.g., the device 102 and/or the camera 106 has been moved to the left, moved to the right, moved up, moved down, rotated to the left, rotated to the right, rotated up, rotated down, or a combination thereof). The device 102 may calculate a current orientation of the device 102 and/or the orientation of the camera 106 based on the additional sensor data.

As the additional image data is received at the camera 106, the device 102 may determine whether the first control is located in the field of view of the camera 106. When the device 102 determines that the first control is located in the field of view of the camera 106, the device 102 may indicate the location of the first control by overlaying one or more symbols (e.g., a box) over the image data, or a portion of the image data, at the display 104. As the device 102 is moved, the direction from the current field of view to the first control may be updated at the display 104. In a particular embodiment, the device 102 may indicate at the display 104 that the field of view of the camera 106 is directed towards the first control even when line of sight between the camera 106 and the first control is obstructed (e.g., by an object or a person between the camera 106 and the control panel). The device 102 may determine that the first control is within the field of view of the camera 106 based on the sensor data received from the one or more sensors. Thus, even when the device 102 is unable to determine whether the first control is within the current field of view of the camera 106 based on the additional image (i.e., because the field of view of the camera 106 is obstructed), the device 102 may update the direction from the current field of view to the first control at the display 104 based on the sensor data. Additionally, the one or more symbols may be presented at the display 104 to indicate that, despite the obstruction, the field of view of the camera 106 is directed at the first control (i.e., the first control is located within the current field of view of the camera 106.

In addition to indicating the direction of the first control from the current field of view, the one or more symbols may indicate a distance of the first control relative to the current field of view of the camera 106. For example, a longer arrow may indicate that the first control is a first distance from the current field of view and as the field of view moves closer to the first control the arrow may get shorter. When the first control is determined to be within the current field of view of the device 102 (i.e., the first control is located within the current field of view of the camera 106), the device 102 may indicate the location of the first control by overlaying one or more symbols (e.g., a box) over the image data (or the one or more images representing the image data), or a portion of the image data, presented at the display 104.

The device 102 may also be configured to present at least one task of the electronic checklist at the display 104 as described with reference to FIGS. 3-7. In a particular embodiment, the at least one task is presented as one or more graphical overlays at the display 104. In a particular embodiment, the location of the graphical overlay(s) may be dependent upon the position of the control to be configured. For example, if the control to be configured is located at the top of the display 104, the graphical overlay(s) indicating the at least one task to be executed may be presented at the display below the control to be configured. If the control to be configured is located at the bottom of the display 104, the graphical overlay(s) indicating the at least one task to be executed may be presented at the display above the control to be configured. If the control to be configured is located on the left side of the display 104, the graphical overlay(s) indicating the at least one task to be executed may be presented at the display to the right of the control to be configured. If the control to be configured is located at right side of the display 104, the graphical overlay(s) indicating the at least one task to be executed may be presented at the display to the left of the control to be configured. In another embodiment, the graphical overlay(s) may partially overlap the control to be configured. In a particular embodiment, the graphical overlay(s) used to present the at least one task of the electronic checklist may be presented as a semitransparent text-box (not shown). The at least one task may be associated with a configuration operation that is to be completed with respect to the first control. For example, the at least one task may indicate that the first control is to be configured according to a first configuration. For example, a particular control (e.g., the knob control 134) may be set to a first setting of a plurality of settings by rotating the particular control to a particular position as described with reference to FIGS. 5-7. Other controls may be configured by moving the control in a particular direction (e.g., sliding the slider control 124 left/right or up/down, toggling a switch control between a first setting (ON) and a second setting (OFF), etc.). The device 102 may identify a current configuration of the first control based on the image data. The device 102 may determine whether the current configuration corresponds to the first configuration based on the image data or based on subsequently received image data (i.e., image data received after a user has modified the configuration of the first control).

In a particular embodiment, when the device 102 determines that the first control is configured according to the first configuration, the device 102 may present an icon (not shown) at the display 104. A selection of the icon may indicate that a user of the device 102 has verified the configuration of the first control. In response to the selection of the icon, the device 102 may determine whether another control is to be configured. In an alternative embodiment, the user verification step may be omitted. For example, when the device 102 determines that the first control is configured according to the first configuration, the device 102 may automatically present an indication of a location or direction of a second control of the control panel and a next task of the electronic checklist at the display 104.

When the device 102 determines that the first control is not configured according to the first configuration, the device 102 may present further information, such as information indicating the first configuration of the first control at the display 104, as explained with reference to FIGS. 5-7. The information indicating the first configuration of the first control may be presented at the display 104 as one or more symbols or graphical overlays. A user of the device 102 may modify the configuration of the first control based on the one or more images and the one or more symbols presented at the display 104. The user may provide an input (e.g., by selecting the icon displayed at the display 104) to the device 102 indicating that the first control has been modified and/or is configured according to the first configuration.

If the modified configuration of the first control does not correspond to the first configuration, the device 102 may present an indication (e.g., a warning message or other indicator) that the first control is not configured according to the first configuration. The user may then reconfigure the first control and provide a second input indicating that the configuration of the first control has been modified. This process may continue until the device 102 determines that the first control is configured according to the first configuration. In another particular embodiment, the device may automatically present a next task of the electronic checklist in response to determining that the first control is configured according to the first configuration.

In a particular embodiment, multiple devices may be networked together (not shown) and used to configure the control panel. For example, a first device, such as the device 102, may be used to configure a first portion of the control panel and a second device (e.g., a device similar to the device 102), may be used to configure a second portion of the control panel. The first device and the second device may apportion the tasks of the electronic checklist according to the configuration of particular controls, according to a location of the devices, according to dependency relationships between the configuration tasks, or any combination thereof. For example, the first device may be located on a first side of the control panel (e.g., the pilot side) and the second device may be located on a second side of the control panel (e.g., the co-pilot side). The first device may guide a first user (e.g., a pilot) through configuration steps associated with configuring controls located on the first side of the control panel and the second device may guide a second user (e.g., a co-pilot) through configuration steps associated with configuring controls located on the second side of the control panel. Controls to be configured that are located in the middle of the control panel may be assigned to one of the devices or a first portion of the controls located in the middle of the control panel may be assigned to the first device and a second portion of the controls located in the middle of the control panel may be assigned to the second device. The devices may communicate with each other during execution of the electronic checklist via a wireless communication link (e.g., a Bluetooth link or an 802.11X link).

In another particular embodiment, the device(s) may provide feedback information to the control panel and other systems that indicates the status of the configuration of the control panel based on the execution of the electronic checklist. For example, the control panel may be configured to communicate with the device(s) via a wired or wireless link. In a particular embodiment, the control panel may store and/or retransmit the feedback information (i.e., the status of the configuration of the control panel). For example, when the electronic checklist is executed during a flight of an aircraft, the control panel may include or may be coupled to a computer device to store the feedback information for subsequent transmittal to a server (e.g., at an airport terminal of an airline company that operates the aircraft). When the aircraft lands, the control panel may access one or more wireless networks and transmit the feedback information to the server of the airline company. Alternatively or in addition to transmitting the feedback information to the server, the feedback information may be retrieved from the control panel (e.g., from a control panel computer) using the wired or wireless link. For example, after the aircraft has landed, personnel associated with maintaining the aircraft may retrieve the feedback information and determine an operational status of the control panel or one or more systems controlled by the control panel.

By using image data received at the camera 106, the device 102 is able to indicate a location and configuration of each control on the control panel in accordance with control settings data (e.g., settings associated with the electronic checklist). Thus, the device 102 is able to verify that the controls are properly configured in accordance with the control settings data (e.g., in compliance with the electronic checklist) based on the image data received from the camera 106. The device 102 provides visual assistance to users configuring a control panel and further provides verification of the configuration of the control panel, resulting in a reduced likelihood of skipped configuration steps and improperly configured controls. When multiple devices 102 are used, the amount of time required to configure the control panel may be reduced, thereby increasing control panel configuration efficiency.

Figure 2:
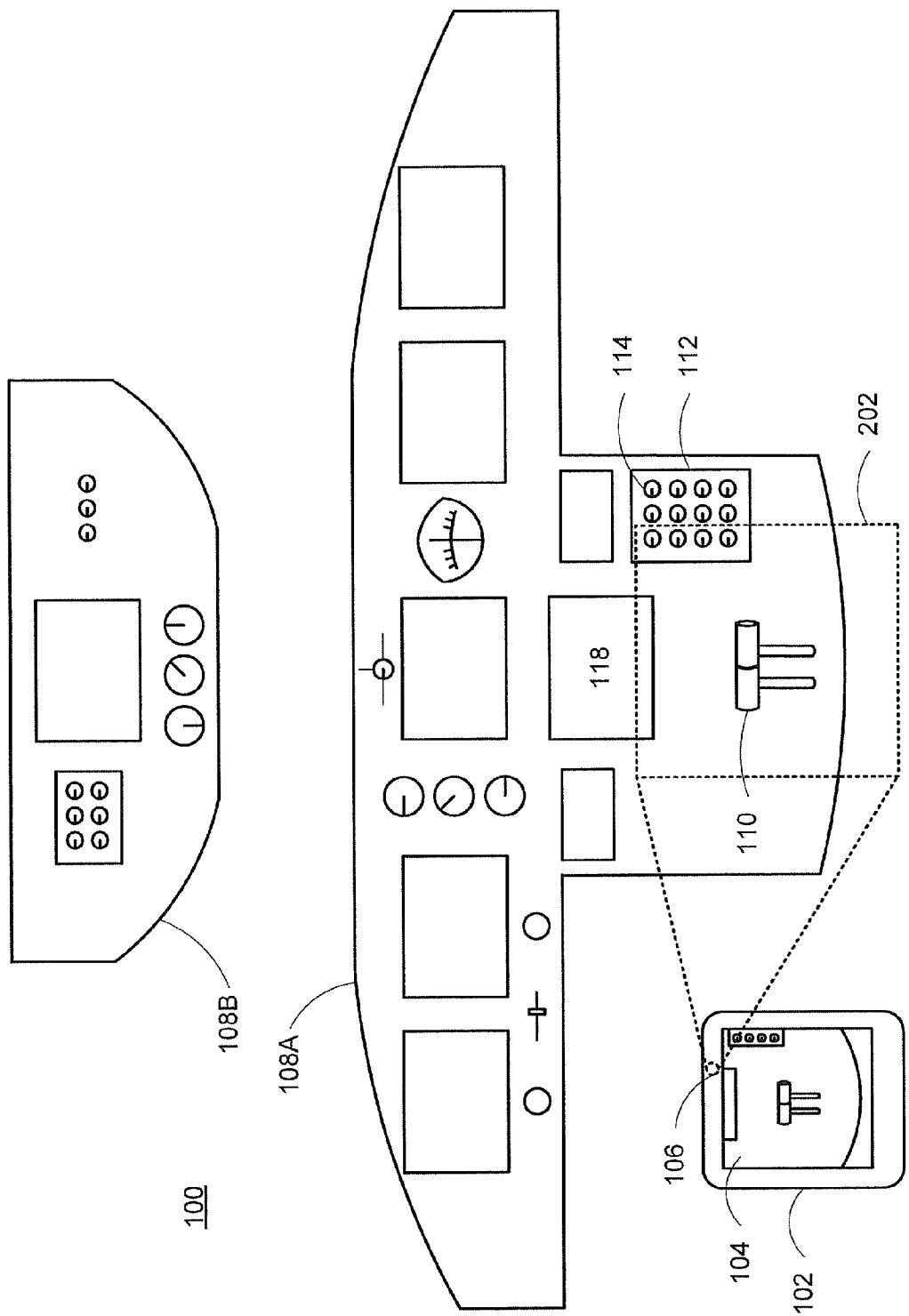
FIG. 2 is a block diagram of another illustrative embodiment of a system to identify and configure a control panel.

Referring to FIG. 2, an illustrative embodiment of the system 100 for identifying and configuring a control panel is disclosed. Elements of FIG. 2 that correspond to elements of FIG. 1 are designated with the same number, and it should be understood that elements in FIG. 2 may operate as described with reference to FIG. 1. Further, additional operational features of the elements of FIG. 1 are described below.

In FIG. 2, the device 102 and the control panel (e.g., the control panels 108A, 108B) are shown. As shown in FIG. 2, the camera 106 has a field of view 202. A portion of the control panel 108A is within the field of view 202. The portion of the control panel 108A includes the thrust levers 110, a portion of the switch box 112, a subset of the switches 114, and a portion of the display 118. As shown in FIG. 2, the portion of the control panel 108A that is within the field of view 202 of the camera 106 is presented at the display 104 of the device 102. While the device 102 is receiving image data and presenting the image data at the display 104, a user may initiate presentation of an electronic checklist associated with configuring the control panel 108A and/or the control panel 108B as described with reference to FIGS. 3-7.

In a particular embodiment, the device 102 may present a menu (not shown) from which the user may indicate a particular control panel to be configured prior to presenting the electronic checklist. For example, the device 102 may store control settings data for a plurality of control panels (e.g., multiple aircraft cockpit control panels) and each of the plurality of control panels may be associated with one or more electronic checklists (e.g., a pre-flight checklist, a landing procedure checklist, another checklist, etc.). The user may indicate a desired electronic checklist by identifying the particular configurable equipment (e.g., an aircraft, factory machinery, a vessel, etc.) and electronic checklist from the menu. For example, the user may provide input to select or otherwise indicate that the particular configurable equipment to be configured is an aircraft. In a particular embodiment, the user may further provide input indicating that the aircraft is a first type of aircraft and that the user would like to configure a particular control panel of the aircraft according to a first electronic checklist (e.g., a pre-flight checklist).

In another embodiment, the device 102 may determine the particular type of checklist and control panel automatically by communicating with the control panel. For example, the device 102 may communicate with the control panel via a wireless communication link (e.g., Bluetooth or 802.11X) (not shown). In another embodiment, the device 102 may be configured to identify the particular type of checklist and control panel based on information embedded in a bar code (not shown). For example, a bar code tag may be placed on the control panel, or at a location proximate to the control panel, and the device 102 may analyze the barcode using bar code image data received from the camera 106. In yet another embodiment, the device 102 (or another device coupled to the device 102) may be configured to identify the particular type of checklist and control panel based on information received from a radio frequency identification (RFID) tag (not shown) attached to the control panel or attached to another location of the configurable equipment (e.g., an aircraft).

In a particular embodiment, the control panel may transmit information that identifies the particular control panel to be configured to the device 102 via the wireless communication link. The device 102 may download one or more checklists associated with the particular control panel via the wireless communication link. The device 102 may determine the appropriate checklist (e.g., the pre-flight checklist) based on information received from the control panel via the wireless communication link or from a source external to the control panel. In another embodiment, the device 102 may identify particular configurable equipment to be configured and access an appropriate checklist associated with configuring the particular configurable equipment via a communication link. The communication link may be one of an electrical communication link, an optical communication link, a radio frequency communication link, or a combination thereof. The communication link may be established between the device 102 and the particular configurable equipment, or may be establish between the device 102 and a configuration system at a location remote to the configurable equipment (e.g., an operations center, a field site, an airport, a factory, an airline operations center, etc.).

In response to detecting a particular condition (e.g., turbulence), the control panel may transmit information to the device 102 indicating that one or more controls of the control panel should be configured. In a particular embodiment, the information may identify the particular condition and the device 102 may determine the one or more controls to be configured based on information stored at the device 102. Determining the one or more controls to be configured may include selecting a particular electronic checklist from among a plurality of electronic checklists stored at the device 102. The particular selected checklist may be identified based on the information that identifies the particular condition. In another particular embodiment, the device 102 may receive an electronic checklist from the control panel along with the information that identifies the particular condition. The device 102 may present the electronic checklist to the user via the display 104 as described with reference to FIGS. 3-7.

In another embodiment, the device 102 may download control settings data and one or more electronic checklists from a server (not shown) via a network (not shown). For example, prior to initiating a takeoff of an aircraft, a user of the device 102 may access the server via a wired or wireless network and download control settings data and one or more checklists associated with the aircraft (e.g., a takeoff checklist, a landing checklist, etc.). The server may be associated with an airline that operates the aircraft or a manufacturer that manufactured the aircraft. The server may request authentication data from the device 102 prior to transmitting the electronic checklist to the device 102. The authentication data may include a username and password, a fingerprint scan, an iris scan, a voice utterance, a scan of a face, a scan or swipe of an identification badge, information received from an RFID tag (embedded in the identification badge), a public/private key authentication, exchange of authentication certificates, or any combination thereof. In response to validating the authentication data, the server may transmit the control settings data and the one or more checklists to the device 102 via the network or the server may transmit a key to unlock data or applications stored at the device 102. In a particular embodiment, the control settings data and/or the checklist(s) may be sent via an unsecured network connection. Alternatively or additionally, the control settings data and/or the checklist(s) may be sent via a secured or encrypted network connection.

In a particular embodiment, the device 102 may transmit information to the server associated with the execution of the electronic checklist. For example, the information may indicate that the checklist was completed successfully, the checklist was not completed, errors occurred during execution of the electronic checklist, etc. The server may store this information for subsequent analysis. The electronic checklist or the control panel design may be modified based on the analysis. In an embodiment, in response to determining that the tasks of the electronic checklist have been completed, the device 102 may send information to the server that indicates a resulting configuration of the control panel. For example, a user of the device 102 may configure a control panel of an aircraft according to a pre-flight checklist. Prior to takeoff, the device 102 may determine that controls associated with the tasks of the electronic checklist have been configured according to the electronic checklist and may transmit a confirmation message to the server via a network. The confirmation message may indicate that the controls were configured according to the pre-flight checklist. In another embodiment, the device 102 may store the information for subsequent transmission to the server. For example, a user of the device 102 may configure the control panel of the aircraft according to a landing procedure checklist. After the landing procedure has been completed and the aircraft has arrived at its destination (e.g., a terminal or service hanger), the device 102 may connect to the network and transmit the confirmation message to the server. In a particular embodiment, the server is associated with an airline company that operates the aircraft. In another particular embodiment, the server is associated with a regulatory agency responsible for establishing guidelines for operating the aircraft.

In a particular embodiment, the device 102 may receive an override command from a user to skip or otherwise alter a setting associated with a particular configuration task of the electronic checklist. Upon determining that the tasks of the electronic checklist have been either completed or overridden, the device 102 may send information (e.g., the confirmation message) to the server that indicates a result of each task (i.e., completed or overridden).

Thus, the device 102 may determine one or more controls of a control panel to be configured according to control settings data associated with the control panel. The device 102 may enable a user to select a particular electronic checklist when configuring one or more controls of the control panel. Additionally, the device 102 may automatically download and store multiple electronic checklists associated with the control panel and communicate with the control panel to identify and select a particular electronic checklist to be completed.

Figure 3:
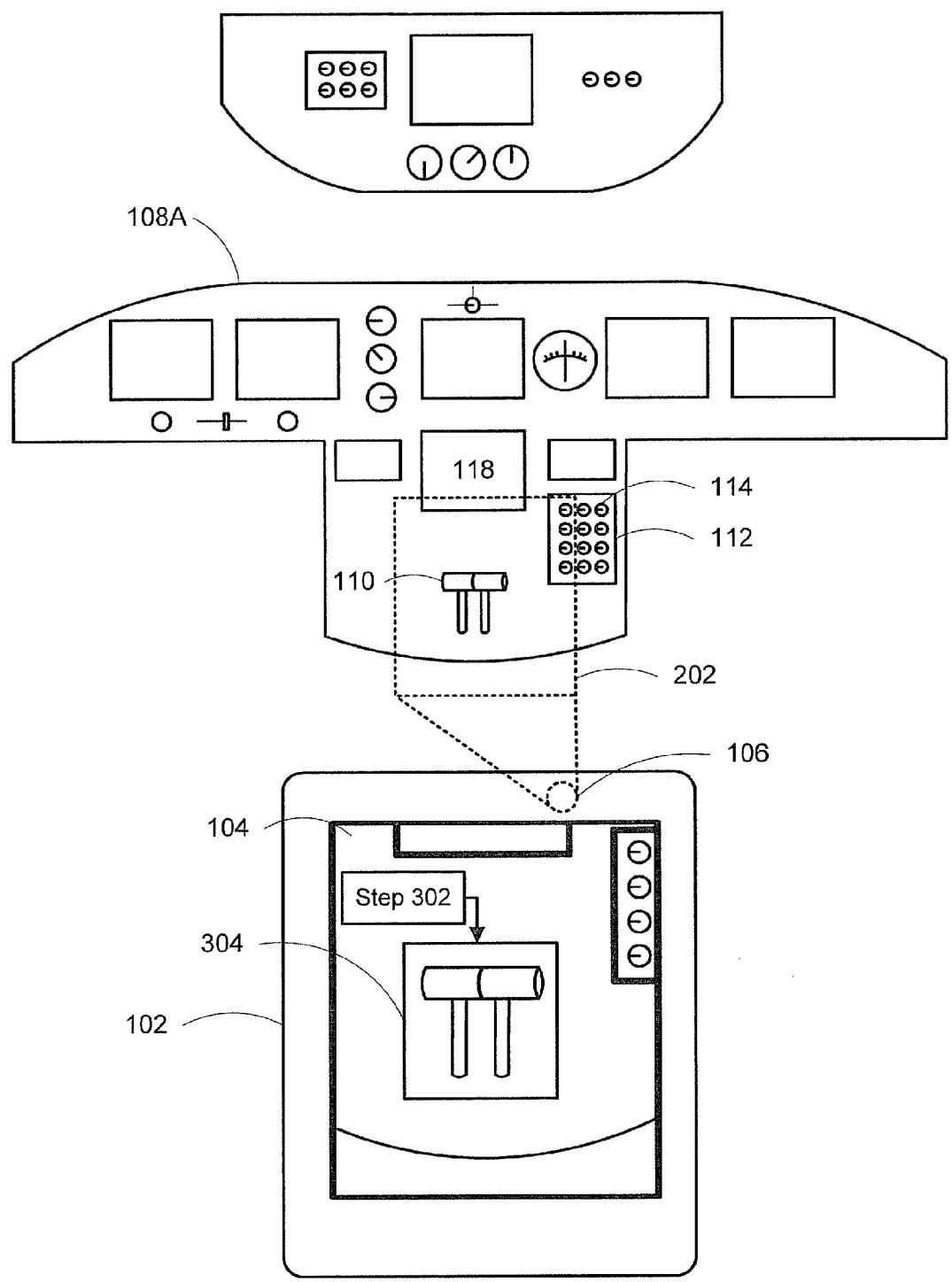
FIG. 3 is a block diagram of another illustrative embodiment of a system to identify and configure a control panel.

Referring to FIG. 3, an illustrative embodiment of the system 100 for identifying and configuring a control panel is disclosed. Elements of FIG. 3 that correspond to elements of FIG. 1 and FIG. 2 are designated with the same number, and it should be understood that elements in FIG. 3 may operate as described with reference to FIG. 1 and FIG. 2. Further, additional operational features of the elements of FIG. 1 and FIG. 2 are described below.

As shown in FIG. 3, the device 102 may receive image data associated with a portion of the control panel 108A from the camera 106 and present the image data at the display 104. The device 102 may present information regarding a first configuration step (e.g., step 302) at the display 104 as a graphical overlay on top of the image data. In a particular embodiment, the first configuration step may be a calibration step. During the calibration step, the device 102 determines calibration data based on a location of the camera 106 relative to one or more calibration features of the control panel. For example, the first configuration step may indicate that the camera 106 should be directed towards the thrust levers 110 until the thrust levers 110 are within the field of view 202. When the thrust levers 110 are within the field of view 202, the device 102 may use one or more symbols (e.g., the box 304) to highlight the thrust levers 110 at the display 104.

In a particular embodiment, determining the calibration data may include determining an orientation of the device 102 and/or the camera 106 based on sensor data received from one or more sensors (e.g., inertial sensors and orientation sensors). The one or more sensors may include one or more sensors internal to the device 102, one or more sensors external to the device 102 (e.g., when the camera 106 is located external to the device 102), or a combination of internal and external sensors may be used. In a particular embodiment, the orientation of the device 102 may be determined based on the sensor data and information determined based on the calibration features detected based on the image data received from the camera 106. In a particular embodiment, during operation (e.g., while performing a checklist) the device 102 may determine whether at least one calibration feature is detected based on the image data received from the camera 106 and may automatically recalibrate the one or more sensors when the at least calibration feature is detected based on the received image data.

When the calibration feature is within the field of view 202, the device 102 may determine a location of one or more controls relative to the calibration feature. The one or more controls may be associated with controls to be configured based on control settings data (e.g., the selected electronic checklist). In a particular embodiment, the calibration step for a particular control panel is executed during each use of the device 102. Alternatively, the calibration step may be executed prior to a first use of the device 102 to configure the particular control panel and the calibration step is not executed prior to a subsequent use of the device 102 to configure the particular control panel. For example, if the user calibrates the device 102 during configuration of a control panel according to a pre-flight checklist, the device 102 does not need to be calibrated again when configuring the control panel according to a landing procedure checklist.

In a particular embodiment, the control settings data is ordered according to a predetermined order and the device 102 presents the electronic checklist steps according to the predetermined order. In another particular embodiment, the device 102 may identify controls of the control panel to be configured based on the control settings data and may further determine an order in which to present the electronic checklist steps at the display 104. The control settings data may indicate that a configuration of a first control is dependent upon a configuration of a second control. The device 102 may account for dependency relationships, such as the dependency of the configuration of the first control on the configuration of the second control, when ordering the electronic checklist steps.

In a particular embodiment, a particular electronic checklist task may be optional. The device 102 may order the steps of the electronic checklist based on whether a particular step or task is optional or required. For example, a first configuration task may be optional and a second configuration task may be required. In a particular embodiment, the device 102 may order the electronic checklist tasks such that all required checklist tasks are inserted into the electronic checklist before all optional electronic checklist tasks. In another particular embodiment, the checklist tasks may be presented according to a predetermined order and any optional checklist tasks may be distinguished from required checklist tasks using a color scheme (e.g., a first color for required tasks and a second color for optional tasks), using symbols (e.g., a first symbol indicates a required task and a second symbol indicates an optional task), or a combination of colors and symbols.

In another particular embodiment, the device 102 may present an override option (not shown) at the display 104. The override option may be used by the user to skip a particular checklist task or to proceed to the next configuration task/control even though the current configuration task/control has not been completed, has not been verified, or has been completed in a manner inconsistent with the control settings data.

In a particular embodiment, the one or more calibration features of the control panel are identified based on the control settings data. In another particular embodiment, the one or more calibration features are associated with detectable features (e.g., visual markers or cues, bar codes, orientation markers, etc.) located on the control panel that may be used by the device 102 to identify a location of a unique calibration feature. The location of the unique calibration feature may be further identified based on the control settings data. In an embodiment, information identifying the unique location may be encoded in at least one of the one or more calibration features. For example, a particular calibration feature may include a two-dimensional barcode that encodes longer data sequences that identify the location of the particular calibration feature. In another embodiment, the control settings data identifies each control of the control panel and any control placed in the field of view 202 of the camera 106 may be used by the device 102 to calibrate the device 102 to the control panel. In a particular embodiment, calibrating the device 102 results in an identification of a first step of the electronic checklist and identification of a location of a control to be configured during the first step. In a particular embodiment, the device 102 may update the calibration data in response to detecting a calibration feature during configuration of the control panel according to an electronic checklist. For example, at an arbitrary point in a checklist process, the device 102 may detect a calibration feature and update the calibration data based on the detected calibration feature.

Figures 4A, 4B:
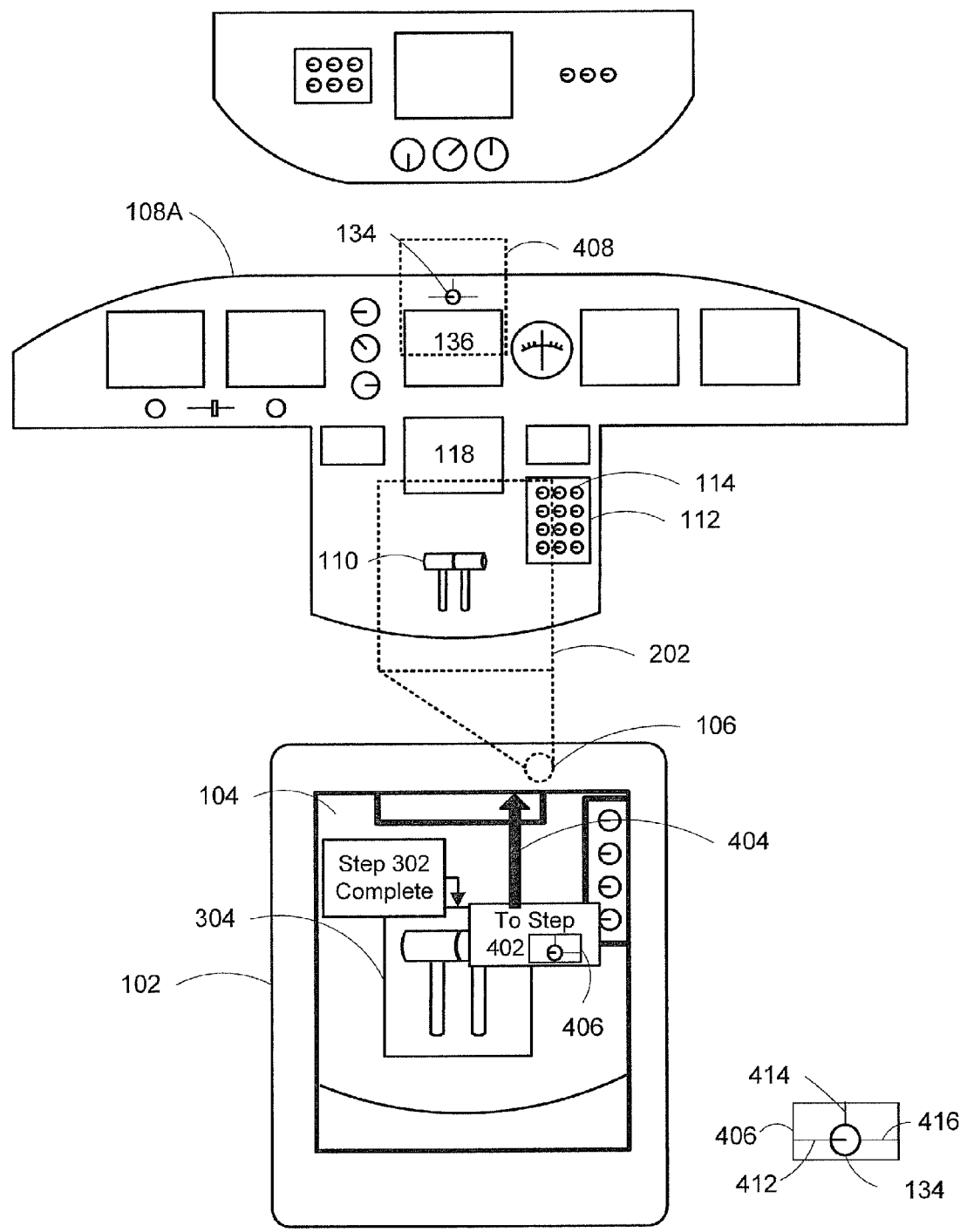
FIGS. 4A and 4B are diagrams of another illustrative embodiment of a system to identify and configure a control panel.

Referring to FIG. 4A, an illustrative embodiment of the system 100 for identifying and configuring a control panel is disclosed. Elements of FIG. 4A that correspond to elements of FIGS. 1-3 are designated with the same number, and it should be understood that elements in FIG. 4A may operate as described with reference to FIGS. 1-3. Further, additional operational features of the elements of FIGS. 1-3 are described below.

As shown in FIG. 4A, the device 102 may indicate that the first configuration step (e.g., step 302) is complete and provide an indication of a next configuration step (e.g., step 402). In a particular embodiment, the device 102 may indicate that an electronic checklist task is complete by modifying a color of the one or more symbols presented at the display 104. For example, the box 304 may be a first color (e.g., a red box) indicating that the step 302 is not complete. The color of the box 304 may be changed to a second color (e.g., a green box) in response to detecting that the step 302 is complete.

The device 102 may indicate the next configuration step at the display 104 as a graphical overlay. In a particular embodiment, the graphical overlay includes an icon 406. The icon 406 may be an image associated with the control to be configured in the next configuration step. For example, referring to FIG. 4B, a larger view of the icon 406 is shown. The icon 406 includes an image of a knob control 134. The knob control 134 may be configured to one of a first configuration 412, a second configuration 414, and a third configuration 416 by rotating the knob control 134 until the line on the knob control 134 lines up with one of the configurations indicators.

Referring to FIG. 4A, the device 102 may determine the location of the control associated with the next configuration step (e.g., step 402). As shown in FIG. 4A, the device 102 may determine that the control associated with the next configuration step is the knob control 134. The device 102 may determine that the knob control 134 is located in a target field of view 408 that not within the current field of view 202. In response to determining that the target field of view 408 is not within the current field of view 202, the device 102 may present one or more symbols (e.g., arrow 404) as graphical overlays at the display 104. The one or more symbols indicate a direction of the target field of view 408 (and the control associated with the next configuration step (e.g., step 402)).

Figures 5A, 5B:
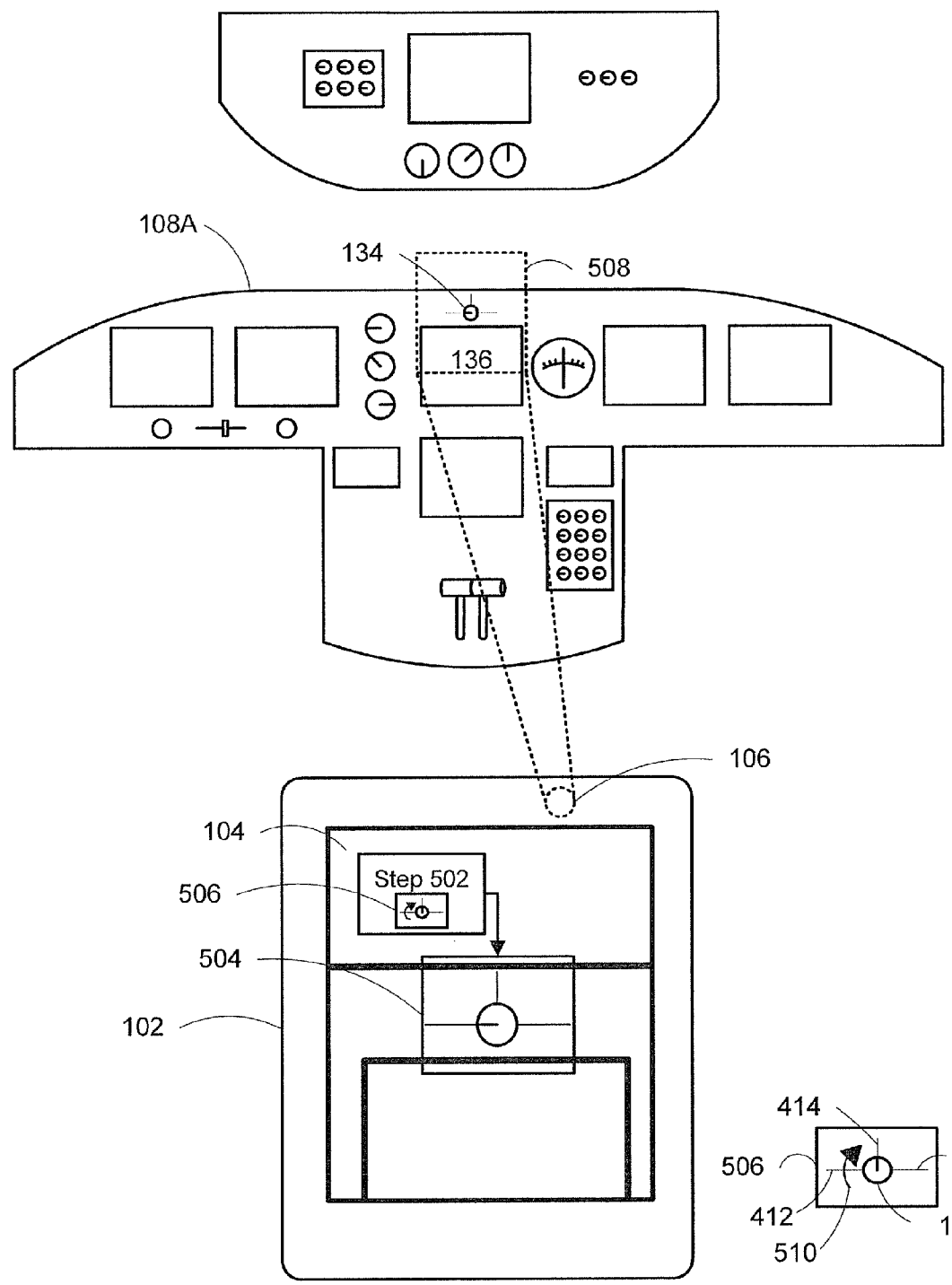
FIGS. 5A and 5B are diagrams of another illustrative embodiment of a system to identify and configure a control panel.

Referring to FIGS. 5A and 5B, another illustrative embodiment of the system 100 for identifying and configuring a control panel is disclosed. Elements of FIGS. 5A and 5B that correspond to elements of FIGS. 1-4 are designated with the same number, and it should be understood that elements in FIGS. 5A and 5B may operate as described with reference to FIGS. 1-4. Further, additional operational features of the elements of FIGS. 1-4 are described below.

As shown in FIG. 5A, the camera 106 has been moved in the direction indicated by the arrow 404 of FIG. 4A until the field of view 508 of the camera 106 approximates or substantially covers the target field of view 408 of FIG. 4A.

In response to determining that the knob control 134 is within the field of view 508 (i.e., the current field of view of the camera 106), the device 102 may provide an indication of the location of the control (e.g., the knob control 134) associated with the next configuration step (e.g., step 402 of FIG. 4A). For example, the device 102 may highlight the location of the knob control 134 using one or more symbols (e.g., a box 504) as graphical overlays at the display 104.

In response to determining that the image data received from the camera 106 includes the location of the control associated with the next configuration step (e.g., step 402), the device 102 may determine a current configuration of the control based on the image data. After determining the current configuration of the control, the device 102 may determine whether the configuration of the control corresponds to a configuration identified by the control settings data. If the configuration of the control does not correspond to the configuration identified by the control settings data, the device 102 may update the indication of the next configuration step at the display 104 to indicate the configuration identified by the control settings data (e.g., step 502).

The updated next configuration step may indicate the configuration identified by the control settings data via an icon 506. For example, referring to FIG. 5B, a larger view of the icon 506 is shown. The icon 506 includes an image of the knob control 134. The knob control 134 may be configured to one of a first configuration 412, a second configuration 414, and a third configuration 416 by rotating the knob control 134 until the line on the knob control 134 lines up with one of the configuration indicators.

The icon 506 also includes an arrow 510 that indicates a direction to rotate the knob control 134 and also identifies the configuration of the control identified by the control settings data. For example, FIG. 5A shows the current configuration of the knob control 134 as presented at display 104. The knob control 134 is highlighted by box 504 and is currently configured to the first configuration 412. The configuration identified by the control settings data is indicated by the configuration of the knob control 134 as shown at the icon 506. The icon 506 indicates that the knob control 134 should be configured to the second configuration 414. The icon 506 further indicates that to modify the current configuration of the knob control 134 to correspond to the configuration identified by the control settings data (i.e., the second configuration 414), the knob control 134 should be turned clockwise until the current configuration of the knob control 134 as presented at the display 104 corresponds to the second configuration 414.

Figures 6A, 6B:
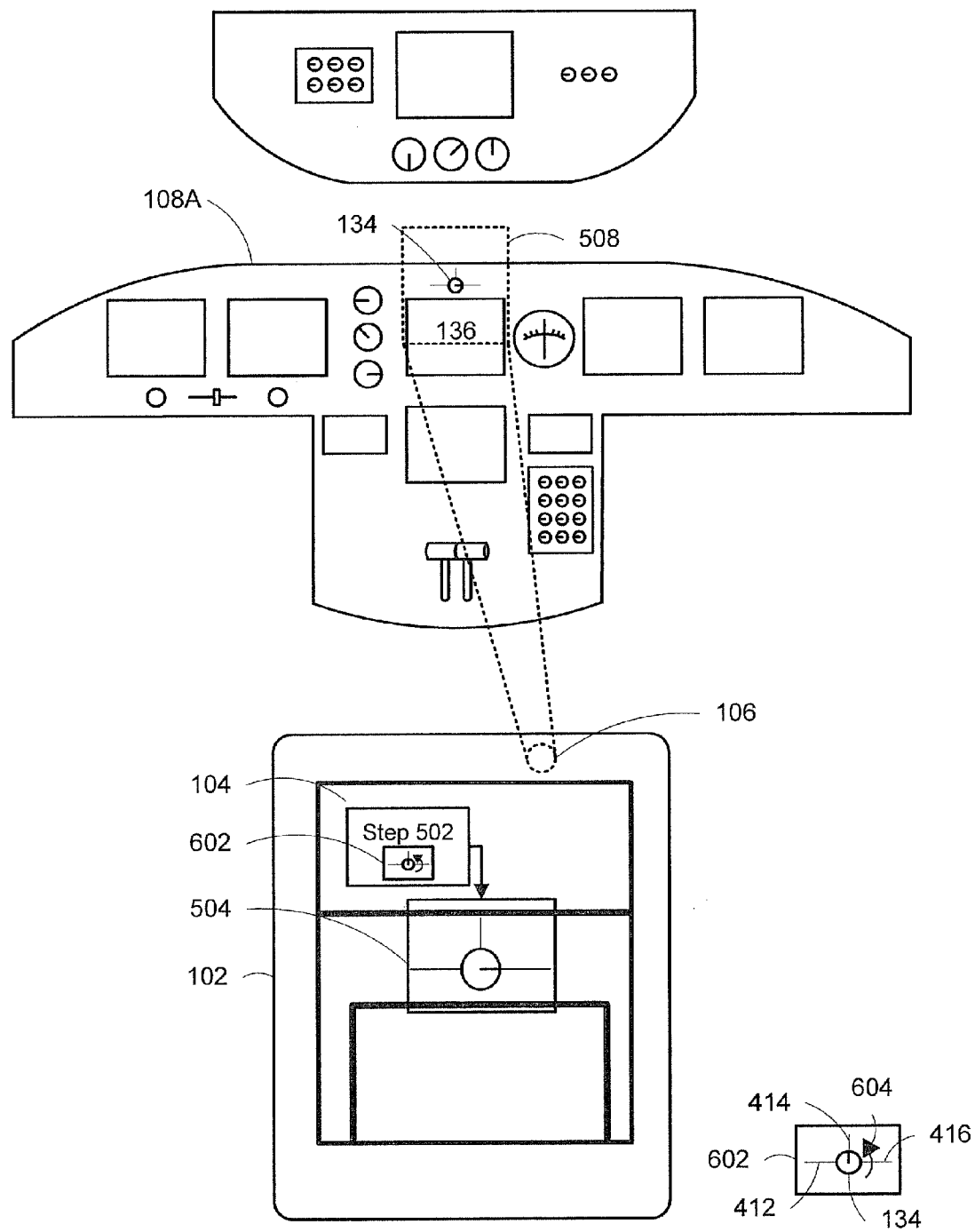
FIGS. 6A and 6B are diagrams of another illustrative embodiment of a system to identify and configure a control panel.

Referring to FIGS. 6A and 6B, another illustrative embodiment of the system 100 for identifying and configuring a control panel is disclosed. Elements of FIGS. 6A and 6B that correspond to elements of FIGS. 1-5 are designated with the same number, and it should be understood that elements in FIGS. 6A and 6B may operate as described with reference to FIGS. 1-5. Further, additional operational features of the elements of FIGS. 1-5 are described below.

As shown in FIG. 6A, the current field of view of the camera 106 is the field of view 508 and the device 102 may receive image data corresponding to the field of view 508 and present the image data at the display 104. In FIG. 6A, the configuration of the knob control 134 has been modified. The device 102 may detect that the configuration of the knob control 134 has been modified and determine whether the current configuration of the knob control 134 corresponds to the configuration identified by the control settings data (e.g., the second configuration 414).

As shown in FIG. 6A, the modified configuration of the knob control 134 does not correspond to the configuration identified by the control settings data. For example, the control settings data indicates that the knob control 134 should be configured to the second configuration 414 rather than to the third configuration 416. In response to determining that the current configuration (i.e., the modified configuration) of the knob control 134 does not correspond to the configuration identified by the control settings data, the device 102 may modify or otherwise update the display 104 to indicate that the control associated with the step 502 is not configured properly.

In a particular embodiment, the device 102 may update the display 104 by replacing the icon 506 with another icon (e.g., an icon 602). For example, referring to FIG. 6B, a larger view of the icon 602 is shown. The icon 602 includes an image of the knob control 134. The knob control 134 may be configured to one of a first configuration 412, a second configuration 414, and a third configuration 416 by rotating the knob control 134 until the line on the knob control 134 lines up with one of the configuration indicators.

The icon 602 includes an arrow 604 that indicates a direction to rotate the knob control 134 and also identifies the configuration of the control identified by the control settings data. For example, FIG. 6A shows the current configuration of the knob control 134 as presented at display 104. The knob control 134 is highlighted by the box 504 and is currently configured to the third configuration 416. The configuration identified by the control settings data is indicated by the configuration of the knob control 134 as shown at the icon 602. The icon 602 indicates that the knob control 134 should be configured to the second configuration 414. The icon 602 further indicates that to modify the current configuration of the knob control 134 to correspond to the configuration identified by the control settings data (i.e., the second configuration 414), the knob control 134 should be turned counter-clockwise until the current configuration of the knob control 134 corresponds to the second configuration 414.

Figure 7:
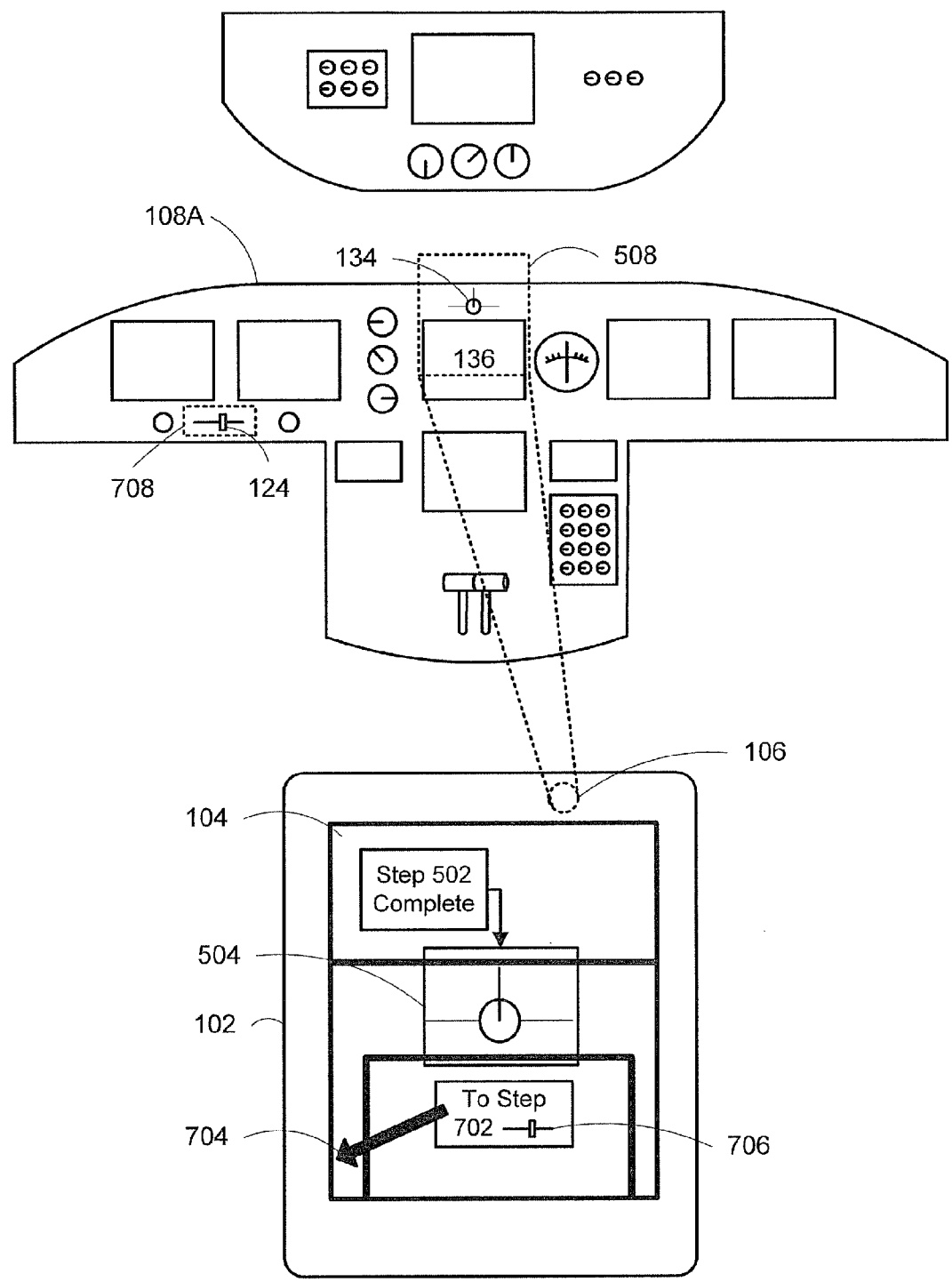
FIG. 7 is a diagram of another illustrative embodiment of a system to identify and configure a control panel.

Referring to FIG. 7, another illustrative embodiment of the system 100 for identifying and configuring a control panel is disclosed. Elements of FIG. 7 that correspond to elements of FIGS. 1-6 are designated with the same number, and it should be understood that elements in FIG. 7 may operate as described with reference to FIGS. 1-6. Further, additional operational features of the elements of FIGS. 1-6 are described below.

As shown in FIG. 7, the device 102 may receive image data from the camera 106 that corresponds to the field of view 508 and present the image data at the display 104. In FIG. 7, the configuration of the knob control 134 has been modified from its previous configuration (i.e., the configuration of the knob control 134 in FIG. 6). The device 102 may detect that the configuration of the knob control 134 has been modified and determine whether the current configuration of the knob control 134 corresponds to the configuration identified by the control settings data (e.g., the second configuration 414).

As shown in FIG. 7, the modified configuration of the knob control 134 corresponds to the configuration identified by the control settings data (i.e., the second configuration 414). In response to determining that the knob control 134 is properly configured, the device 102 may update the display 104 to indicate that the configuration step 502 is complete and provide an indication of a location of a control associated with another configuration step (e.g., a step 702) to be completed. The device 102 may indicate the next configuration step at the display 104 as a graphical overlay. The device 102 may determine that a control associated with the next configuration step is the slide control 124. In a particular embodiment, the graphical overlay includes an icon 706. The icon 706 may be an image associated with the control to be configured in the next configuration step (e.g., the step 702). For example, in FIG. 7, the icon 706 includes an image of the slide control 124.

As shown in FIG. 7, the device 102 may determine that the slide control 124 is located in a target field of view 708 that is not within the current field of view 508 of the camera 106. In response to determining that the slide control 124 is not within the current field of view 508, the device 102 may present one or more symbols (e.g., an arrow 704) as graphical overlays at the display 104. The one or more symbols (e.g., the arrow 704) indicate a direction of the slide control 124.

By executing the electronic checklist while using the device 102, the number of configuration errors that occur when configuring the control panel may be reduced. Additionally, by using image data received from the camera 106, the device 102 may verify that each control is configured properly (i.e., according to the control settings data). Because the device 102 provides an indication of the particular control to be configured for each task on the electronic checklist, a person unfamiliar with configuring the control panel can complete the electronic checklist tasks and properly configure the controls.

Figure 8:
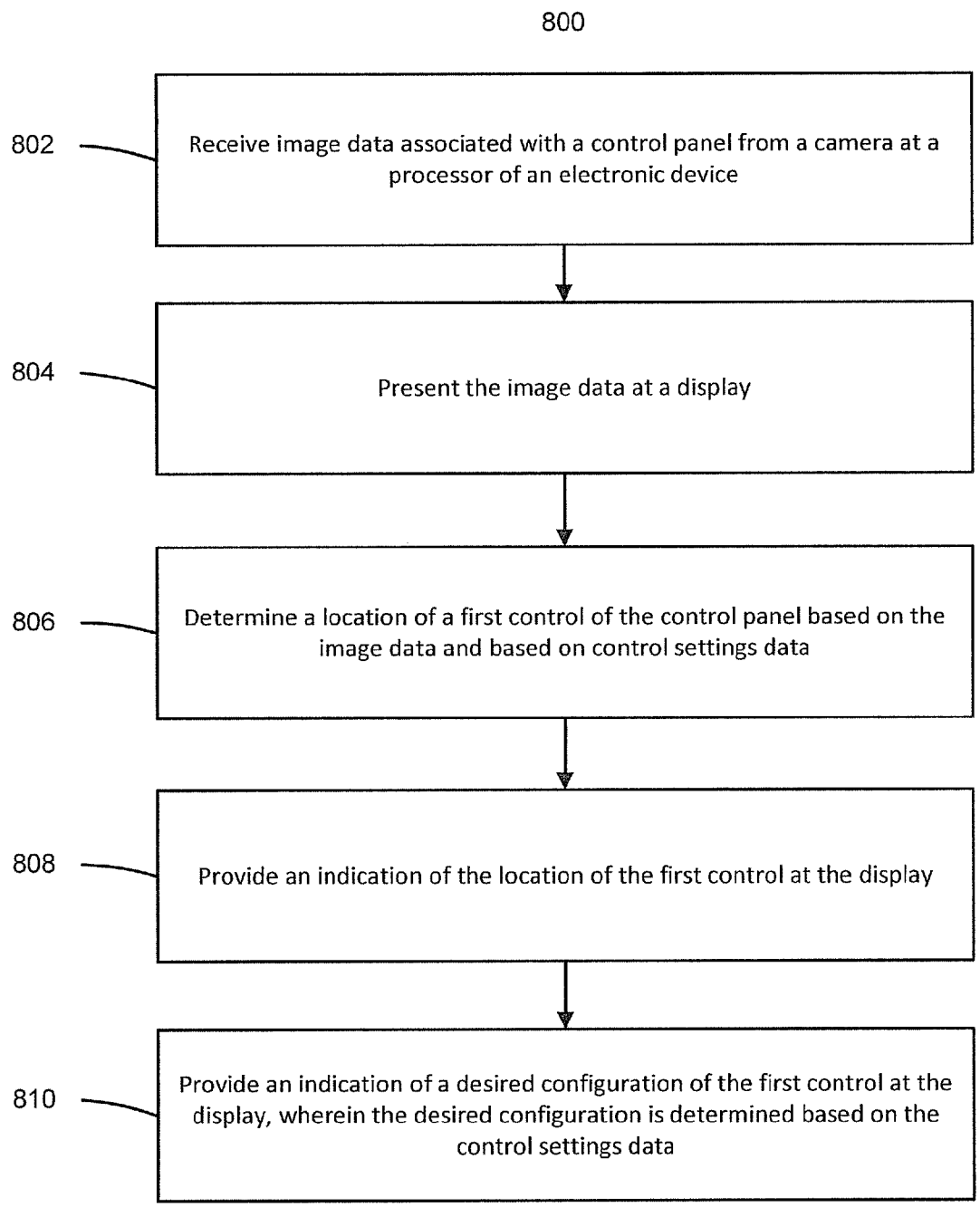
FIG. 8 is a flow chart of a particular embodiment of a method of identifying and configuring a control panel.

Referring to FIG. 8, an embodiment of a method of identifying and configuring a control panel is described and generally designated 800. The method 800 may be performed by the device 102 of FIGS. 1-7. At 802, the method 800 may include receiving image data associated with a control panel from a camera at a processor of an electronic device. For example, as described with reference to FIG. 5A, the device 102 may receive image data from the camera 106. The image data may correspond to the field of view 508 of the camera 106. At 804, the method includes presenting one or more images generated based on the image data at a display of the electronic device. For example, as shown in FIG. 5A, the device 102 may present one or more images at the display 104. The one or more images may represent at least a portion of the control panel 108A that is within the field of view 508.

At 806, the method includes determining a location of a first control of the control panel based on the image data and based on control settings data. For example, as described with reference to FIG. 5A, the device 102 may determine that the knob control 134 is within the field of view 508. As described above, in a particular embodiment, the location of the first control may further be determined based on sensor data received by the device 102 from one or more sensors (e.g., the one or more inertial sensors and the one or more orientation sensors). At 808, the method includes providing an indication of the location of the first control at the display. For example, as described with reference to FIG. 5A, the device 102 may present one or more symbols (e.g., the box 504) at the display 104. At 810, the method includes providing an indication of a desired configuration of the first control at the display. For example, as described with reference to FIG. 5A, the device 102 may present one or more symbols (e.g., step 502 and the icon 506) at the display 104. The desired configuration of the first control may be determined based on the control settings data.

Figure 9:
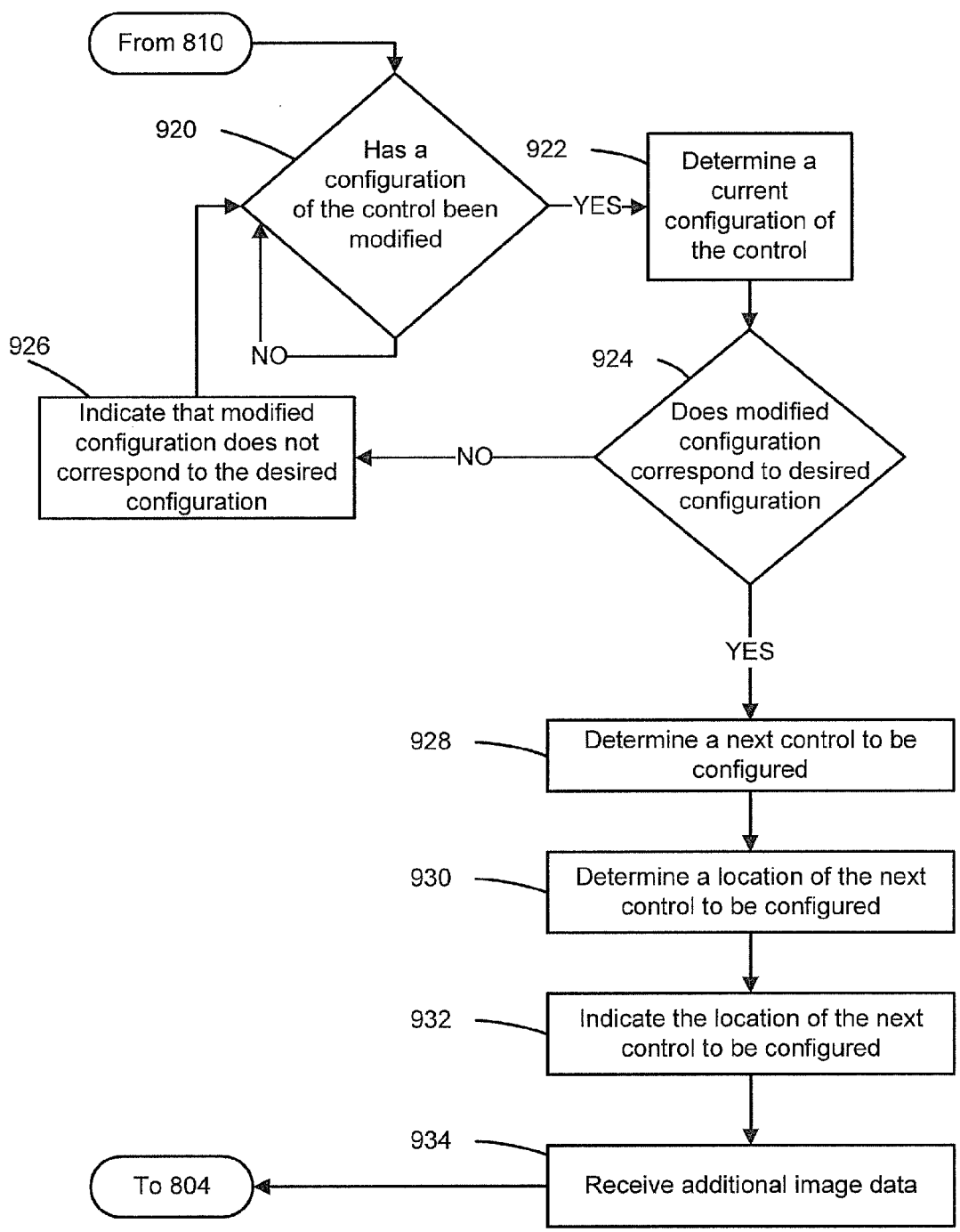
FIG. 9 is a flow chart showing additional portions of the method for identifying and configuring a control panel of FIG. 8 according to a particular embodiment.

Referring to FIG. 9, a user may modify the configuration of the first control based on the one or more images and the one or more symbols presented at the display. At 920, the method includes determining whether the configuration of the first control has been modified. In response to a determination that the configuration of the first control has not been modified, the method may include re-determining whether the configuration of the first control has been modified, at 920. In a particular embodiment, the device may delay re-determining whether the configuration of the first control has been modified for a period of time. In response to a determination that the configuration of the first control has been modified, the method may include determining a modified configuration of the first control, at 922. At 924, the method may include determining whether the modified configuration of the first control corresponds to the desired configuration. At 926, when the modified configuration of the first control does not correspond to the desired configuration, the method may include indicating that the first control is not configured according to the desired configuration. In a particular embodiment, indicating that the first control is not configured according to the desired configuration may include modifying or otherwise updating the one or more images and the one or more symbols presented at the display. In response to modifying or otherwise updating the one or more images and the one or more symbols presented at the display, the method may include re-determining whether the configuration of the first control has been modified, at 920. The device may delay re-determining whether the configuration of the first control has been modified for the period of time.

At 928, in response to a determination that the modified configuration of the first control corresponds to the desired configuration, the method may include determining a next control of the control panel to be configured, if any. At 930, in response to determining the next control is to be configured, the method may include determining a location of the next control based on the image data received from the camera 106 and based on the control settings data. In a particular embodiment, the location of the next control may be determined based on sensor data received via the one or more sensors. In a particular embodiment, determining the location of the next control includes determining a distance from the first control to the next control and determining a direction from the first control to the next control. At 932, the method may include modifying or otherwise updating the one or more images and the one or more symbols presented at the display based on the image data, the sensor data, the control settings data, or a combination thereof, to indicate the location of the next control. The method may include receiving additional image data from the camera, at 934. In a particular embodiment, the method may include receiving additional sensor data as the device is moved. For example, as the device 102 of FIGS. 1-7 is moved, the camera 106 may capture the additional image data, the sensors may generate the additional sensor data, or both. In response to receiving the additional image data, the method may include presenting one or more additional images generated based on the additional image data at a display. The device 102 may perform additional operations as described with reference to FIGS. 1-7, and/or may perform the operations in a different order than the order presented above with respect to FIGS. 8 and 9.

Figure 10:
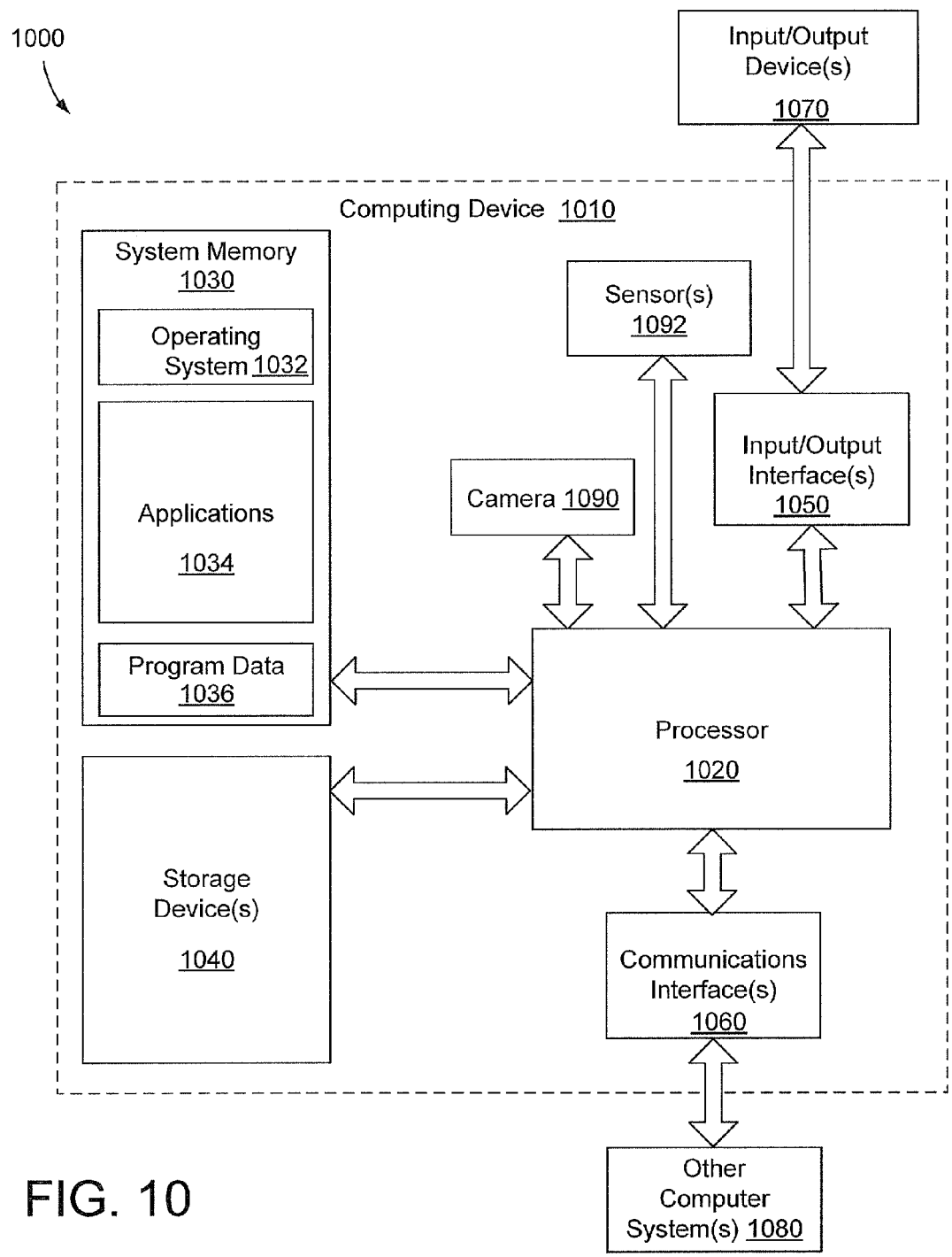
FIG. 10 is a block diagram of an illustrative embodiment of a computer system operable to support the various methods, systems, and computer readable media disclosed with respect to FIGS. 1-9.

FIG. 10 is a block diagram of a computing environment 1000 including a general purpose computing device 1010 operable to support embodiments of computer-implemented methods and computer-executable program instructions according to the present disclosure. For example, the computing device 1010, or portions thereof, may implement, include, or be included within any one or more of the embodiments, or components thereof, illustrated in FIGS. 1-7. The computing device 1010 may include at least one processor 1020. Within the computing device 1010, the processor 1020 communicates with a system memory 1030, one or more storage devices 1040, one or more input/output interfaces 1050, one or more communications interfaces 1060, and at least one camera 1090 In a particular embodiment, the computing device 1010 includes one or more sensors 1092. The one or more sensors may include inertial sensors, motion sensors, orientation sensors, or a combination thereof.

The system memory 1030 may include volatile memory devices (e.g., random access memory (RAM) devices), nonvolatile memory devices (e.g., read-only memory (ROM) devices, programmable read-only memory, and flash memory), or both. The system memory 1030 may include an operating system 1032, which may include a basic/input output system (BIOS) for booting the computing device 1010 as well as a full operating system to enable the computing device 1010 to interact with users, other programs, and other devices. The system memory 1030 includes one or more application programs 1034, such as an application program to present an electronic checklist and image data and graphic overlays for use in configuring a control panel as described above. The system memory 1030 also may include program data 1036.

The processor 1020 may communicate with one or more storage devices 1040. For example, the one or more storage devices 1040 may include nonvolatile storage devices, such as magnetic disks, optical disks, or flash memory devices. The storage devices 1040 may include both removable and non-removable memory devices. The storage devices 1040 may be configured to store an operating system, applications, and program data. In a particular embodiment, the system memory 1030, the storage devices 1040, or both, include tangible, non-transitory computer-readable media.

The processor 1020 may also communicate with one or more input/output interfaces 1050 that enable the computing device 1010 to communicate with one or more input/output devices 1070 to facilitate user interaction. The input/output interfaces 1050 may include serial interfaces (e.g., universal serial bus (USB) interfaces or IEEE 1394 interfaces), parallel interfaces, display adapters, audio adapters, and other interfaces. The input/output devices 1070 may include keyboards, pointing devices, one or more displays, speakers, microphones, touch screens, and other devices. In a particular embodiment, the one or more displays may include at least one touch screen display. The at least one touch screen display may be coated with a fingerprint-resistant coating.

The processor 1020 may communicate with other computer systems 1080 via the one or more communications interfaces 1060. The one or more communications interfaces 1060 may include wired Ethernet interfaces, IEEE 802.11 a/b/g/n wireless interfaces, Bluetooth communication interfaces, $3^{rd}$ generation (3G) communication interfaces, $4^{th}$ generation (4G) communication interfaces, long term evolution (LTE) communication interfaces, high speed packet access (HSPA) communication interfaces, HSPA+ communication interfaces, dual cell (DC)-HSDPA communication interfaces, global system for mobile communications (GSM) communication interfaces, enhanced data rates for GSM evolution (EDGE) communication interfaces, evolved EDGE Universal Mobile Telecommunications System (UMTS) communication interfaces, code division multiple access (CDMA) communication interfaces, time division multiple access (TDMA) communication interfaces, frequency division multiple access (FDMA) communication interfaces, orthogonal frequency division multiple access (OFDMA) communication interfaces, single-carrier frequency division multiple access (SC-FDMA) communication interfaces, optical communication interfaces, other network interfaces, or any combination thereof. The other computer systems 1080 may include host computers, servers, workstations, and other computing devices.

The camera 1090 may be operable to generate and communicate image data to the processor 1020. The camera 1090 may include additional modules (not shown) that provide additional image processing operations such as a digital zoom operation, an optical zoom operation, and an autofocus operation. In a particular embodiment, the camera 1090 may be a digital camera that is operable to generate still images and/or standard/high-definition video. In a particular embodiment, the camera 1090 may be at least partially external to the computing device 1010. For example, the camera 1090 may include one or more image sensor lenses that are attached or otherwise integrated with the computing device 1010 and that are communicatively coupled to the processor 1020. In a particular embodiment, the processor 1020 may generate one or more images to be displayed at a display based on image data received from the image sensor lenses. In another embodiment, the one or more image sensor lenses are communicatively coupled to another processor (e.g., a graphics processing unit (not shown)) that is configured to generate one or more images based on image data received from the image sensor lenses and to present the one or more images at a display. In another embodiment, the camera 1090 may be located external to the computing device 1010 (e.g., on a headset) and may communicate the image data to the computing device 1010 via the input/output interface(s) 1050 or the communication interface(s) 1060. For example, the camera 1090 may be communicatively coupled to the computing device 1010 via a USB connection or a Bluetooth link.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may have been grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
   receiving, at a processor from a movable camera, image data associated with a control panel;
   presenting one or more images at a display available to a pilot, wherein the one or more images are generated based on the image data;
   retrieving control settings data from an electronic checklist stored in a memory accessible by the processor;
   comparing the image data to the control settings data to determine a first location of a first control of the control panel relative to a particular location of the control panel corresponding to the image data;
   determining whether the particular location corresponds to the first location;
   in response to the particular location not corresponding to the first location, providing a first indication of the first location of the first control at the display; and
   in response to the particular location corresponding to the first location:
     determining a desired configuration of the first control based on the control settings data;
     providing a second indication of the desired configuration of the first control at the display;
     after providing the second indication, receiving input indicating that a configuration of the first control has been modified;
     after receiving the input, receiving second image data associated with the control panel, wherein the second image data represents a modified configuration of the first control;
     determining whether the modified configuration of the first control corresponds to the desired configuration of the first control based on the second image data and based on the control settings data; and
     in response to a determination that the modified configuration of the first control corresponds to the desired configuration of the first control, presenting an icon at the display, wherein the icon indicates that the modified configuration of the first control corresponds to the desired configuration.

2. The method of claim 1, further comprising:
   in response to the pilot selecting the icon, determining that a second control is to be configured;
   presenting one or more additional images at the display, wherein the one or more additional images are generated based on the second image data;
   comparing the second image data to the control settings data to determine a second location of the second control of the control panel relative to a second particular location of the control panel corresponding to the second image data;
   determining whether the second particular location corresponds to the second location;
   in response to the second particular location not corresponding to the second location, providing a third indication of the second location of the second control at the display, wherein the third indication indicates a direction to move the movable camera so that the movable camera is pointed at the second control; and
   in response to the second particular location corresponding to the second location, providing a fourth indication of a second desired configuration of the second control at the display, wherein the second desired configuration of the second control is determined based on the control settings data.

3. The method of claim 2, wherein the control settings data of the electronic checklist comprises a plurality of steps, wherein the first location and the desired configuration correspond to a first step of the plurality of steps, wherein the second location and the second desired configuration correspond to a second step of the plurality of steps, and wherein the second step is ordered subsequent to the first step in the control settings data.

4. The method of claim 1, further comprising determining calibration data based on a second location of the movable camera relative to a calibration feature, wherein the first location is determined in part based on the calibration data.

5. The method of claim 1, wherein the movable camera is movable relative to the control panel.

6. The method of claim 1, further comprising:
   determining whether the first location is in the field of view of the movable camera, and
   if the first location is not in the field of view of the movable camera, the first indication indicating a direction to move the movable camera.

7. An apparatus comprising:
   a movable camera;
   a processor; and
   a memory comprising:
     an electronic checklist comprising control settings data; and
     instructions that, when executed by the processor, cause the processor to:
       receive image data associated with a control panel from the movable camera;
       present one or more images at a display that is available to a pilot, wherein the one or more images are generated based on the image data;
       compare the image data to the control settings data to determine a first location of a first control of the control panel relative to a particular location of the control panel corresponding to the image data;
       determine whether the particular location corresponds to the first location;
       in response to the particular location not corresponding to the first location, provide a first indication of the first location of the first control at the display; and
       in response to the particular location corresponding to the first location:
         determine a desired configuration of the first control based on the control settings data;
         provide a second indication of the desired configuration of the first control at the display;
         determine whether a configuration of the first control has been modified;
         receive second image data associated with the control panel, wherein the second image data represents a modified configuration of the first control; and
         determine whether the modified configuration of the first control corresponds to the desired configuration of the first control based on the second image data and based on the control settings data.

8. The apparatus of claim 7, wherein the instructions, when executed by the processor, cause the processor to:
   in response to the pilot selecting the icon, determine that a second control is to be configured;

present one or more additional images at the display, wherein the one or more additional images are generated based on the second image data;

compare the second image data to the control settings data to determine a second location of the second control of the control panel relative to a second particular location of the control panel corresponding to the second image data;

determine whether the second particular location corresponds to the second location;

in response to the second particular location not corresponding to the second location, provide a third indication of the second location of the second control at the display; and in response to the second particular location corresponding to the second location, provide a fourth indication of a second desired configuration of the second control at the display, wherein the second desired configuration is determined based on the control settings data.

9. The apparatus of claim 8, wherein the second location is identified relative to the first location, a third location of a reference control, a fourth location of a reference marking, or a combination thereof.

10. The apparatus of claim 7, further comprising at least one sensor, wherein the first location is further determined based on sensor data received from the at least one sensor, and wherein the at least one sensor comprises an inertial sensor, a motion sensor, an orientation sensor, or a combination thereof.

11. The apparatus of claim 7, wherein the control settings data of the electronic checklist comprises control data and directional data, wherein the control data identifies a layout of a plurality of controls of the control panel, and wherein the directional data includes information indicating a direction from a particular control of the plurality of controls to a second control of the plurality of controls.

12. The apparatus of claim 7, wherein the first indication comprises one or more symbols overlaying the image data.

13. The apparatus of claim 7, wherein the first indication includes a direction to move the movable camera if the first location is not in the field of view of the movable camera.

14. A non-transitory computer-readable storage medium comprising instructions that, when executed by a processor, cause the processor to:
receive image data associated with a control panel from a movable camera;
present one or more images at a display available to a pilot, wherein the one or more images are generated based on the image data;
compare the image data to control settings data of an electronic checklist to determine a first location of a first control of the control panel relative to a particular location of the control panel corresponding to the image data;
determine whether the particular location corresponds to the first location;
in response to the particular location not corresponding to the first location provide a first indication of the first location of the first control at the display; and
in response to the particular location corresponding to the first location:
determine a desired configuration of the first control based on the control settings data;
provide a second indication of the desired configuration of the first control at the display;
receive second image data associated with the control panel from the movable camera;
determine whether a configuration of the first control has been modified to a modified configuration based on the second image data; and
determine whether the modified configuration of the first control corresponds to the desired configuration of the first control based on the second image data and based on the control settings data.

15. The non-transitory computer-readable storage medium of claim 14, further comprising instructions that, when executed by the processor, cause the processor to:
in response to the pilot selecting the icon, determine that a second control is to be configured;
present one or more additional images at the display, wherein the one or more additional images are generated based on the second image data;
compare the second image data to the control settings data to determine a second location of the second control of the control panel relative to a second particular location of the control panel corresponding to the second image data;
determine whether the second particular location corresponds to the second location;
in response to the second particular location not corresponding to the second location, provide a third indication of the second location of the second control at the display; and
in response to the second particular location corresponding to the second location, provide a fourth indication of a second desired configuration of the second control at the display, wherein the second desired configuration is determined based on the control settings data.

16. The non-transitory computer-readable storage medium of claim 14, wherein the first control is an input device for a vehicle distinct from the movable camera.

17. The non-transitory computer-readable storage medium of claim 14, further comprising instructions that, when executed by the processor, cause the processor to:
determine whether the first location is in the field of view of the movable camera, and
if the first location is not in the field of view of the movable camera, cause the first indication to indicate a direction to move the movable camera.

* * * * *